United States Patent
Viesselmann

[19]

[11] Patent Number: 6,094,899
[45] Date of Patent: Aug. 1, 2000

[54] SEPARATING ARRANGEMENT FOR ADJACENT BELTS IN A ROUND BALER

[75] Inventor: Kim P. Viesselmann, Grafton, Wis.

[73] Assignee: Gehl Company, West Bend, Wis.

[21] Appl. No.: 09/120,086

[22] Filed: Jul. 21, 1998

[51] Int. Cl.$^7$ .................................................. A01D 39/00
[52] U.S. Cl. ............................................. 56/341; 100/88
[58] Field of Search ............................ 56/341, 342, 343; 100/76, 88, 87; 53/118, 211, 389, 215

[56] References Cited

U.S. PATENT DOCUMENTS

| | | | |
|---|---|---|---|
| 4,077,315 | 3/1978 | Meiers | 100/88 |
| 4,399,746 | 8/1983 | Viaud | 100/88 |
| 5,129,207 | 7/1992 | Butler | 53/118 |
| 5,129,208 | 7/1992 | Van Zee | 53/118 |

*Primary Examiner*—Robert E. Pezzuto
*Attorney, Agent, or Firm*—Andrus, Sceales, Starke & Sawall

[57] ABSTRACT

A belt separating arrangement for a round baler includes a separating member positioned in a run of belts between a pair of spaced baler rollers. The separating member may be in the form of a separating roller with which each belt in a pair of adjacent belts is engaged in a different location, such that the separating member is operable to separate the belts to enable trash to fall into the crop inlet stream for incorporating into a baler. In one form, the separating arrangement includes a separating roll and an auxiliary roll, and each belt in a pair of adjacent belts is trained about the separating roll in a different location, as well as about the auxiliary roll. In another form, the separating arrangement is in the form of a sectioned separating roll, which includes a series of side-by-side roller sections mounted to a shaft such that each roller section can rotate in either direction. Adjacent belts are engaged with the roller sections on opposite sides of an axis of rotation defined by the shaft, to provide a space through which trash adhering to the belts can fall.

21 Claims, 3 Drawing Sheets

SEPARATING ARRANGEMENT FOR ADJACENT BELTS IN A ROUND BALER

BACKGROUND AND SUMMARY

This invention relates to balers for forming round bales of agricultural crop material, and more particularly to a void-forming arrangement for use in a round baler including a series of side-by-side belts.

Round balers typically include a series of parallel rolls mounted between spaced sides, with a series of side-by-side belts trained about the rolls. The belts extend across a crop inlet defined between a pair of spaced rolls, and a pick-up mechanism feeds crop rearwardly to the crop inlet as the baler is moved along a windrow of crop material. As crop material is forced into the inlet, the belts deform inwardly into a rotating bale-forming chamber which compresses the crop material to form a round bale. The belts are trained about a tensioned take-up mechanism, which accommodates bale growth while maintaining tension on the belts.

In a round baler of this type, it is important that the belts remain in contact with the rolls in order to ensure proper belt tracking and advancement. In the past, it has been known for crop material to adhere to the belts as the belts exit the bale-forming chamber. This material, which is commonly known as "trash" because it is not incorporated into the bale, can build up on the rolls and adjacent the sides of the baler, causing belt driving and tracking problems which hinder the performance of the baler and which, in severe cases, may actually stop operation of the baler.

Viaud U.S. Pat. No. 4,399,746 discloses a staggered roll and belt arrangement for reducing trash buildup. In this arrangement, all belts extend between a pair of vertically spaced rolls. A staggered roll is located forwardly of the lower roll in the vertically spaced pair of rolls, and every other one of the belts is trained about the staggered roll as the belts extend between the vertically spaced pair of rolls. This staggered belt arrangement forms void areas through which crop material is allowed to fall.

It is an object of the present invention to provide an improved void-forming arrangement for side-by-side belts in a round baler. Another object of the invention is to provide such an arrangement which is simple in its components and construction, and easily adapted for use in conventional round balers. Yet another object of the invention is to provide such an arrangement which maintains all belts in contact with the same number of rolls within the baler.

In accordance with one aspect of the invention, a round baler includes a series of baler rolls including a pair of spaced rolls defining a crop inlet. A series of side-by-side belts are trained about the series of rolls, and the belts define a bale-forming chamber for receiving crop material from the crop inlet. A belt separating arrangement is located outside the bale-forming chamber for separating adjacent belts. The belt separating arrangement is in the form of a belt-separating member located between a spaced pair of the baler rolls. At least a pair of adjacent belts are engaged with the belt-separating member such that a first belt in the pair of adjacent belts engages the belt-separating member at a first location and a second belt in the pair of adjacent belts engages the belt-separating member at a second location other than the first location. In this manner, at least a portion of the belt-separating member is operable to separate the belts between the pair of spaced baler rolls, to form a space through which trash material can fall. The belt-separating member is preferably in the form of a separating roll located between the spaced pair of baler rolls. The first and second belts in the pair of adjacent belts engage the separating roll at first and second locations, respectively, on the separating roll. In a preferred form, the separating roll is arranged such that the first and second belts are separated at a location spaced vertically above a crop pick-up which feeds crop material into the crop inlet, to allow trash to fall into the incoming stream of crop material for incorporation into a bale.

In one form, the separating roll may include at least a pair of adjacent rotatable roller sections which are rotatable about a common axis of rotation. The first belt engages a first one of the roller sections on one side of the axis of rotation, and the second belt engages a second one of the roller sections on an opposite side of the axis of rotation. The first and second roller sections are preferably rotatably mounted to a shaft which defines the axis of rotation, and are capable of rotating in opposite directions on the shaft due to engagement of the belts with the roller sections on opposite sides of the axis of rotation.

In another form, the separating roll may be in the form of a single rotatable roll, and an auxiliary roll is offset therefrom and rotatable about an axis of rotation substantially parallel to that of the separating roll. The first and second belts in the pair of adjacent belts are each engaged with the auxiliary roll and with the separating roll at first and second locations on the separating roll. The first belt extends from a first one of the pair of spaced baler rolls to a second one of the pair of spaced baler rolls, and is trained first about the separating roll and then about the auxiliary roll therebetween. A second belt in the pair of adjacent belts also extends from the first baler roll to the second baler roll, and is trained first about the auxiliary roll and then about the separating roll therebetween. With this construction, spaces are formed between the adjacent belts in two separate areas, one of which is defined by the first baler roll in combination with the separating roll and the auxiliary roll, and the other of which is defined by the second baler roll in combination with the separating roll and the auxiliary roll. In a preferred form, the auxiliary roll is offset forwardly from the separating roll, such that the spaces between adjacent belts open downwardly to enable crop material to fall into the stream of incoming crop material.

In a preferred form, each pair of adjacent belts are engaged with the belt-separating member, to define a series of spaces throughout the width of the baler for allowing trash material to escape from the path of the belts. In the first form of the invention, the separating roll includes adjacent rotatable roller sections throughout its length, and each belt in a pair of adjacent belts is engaged with its associated roller section on opposite sides of the axis of rotation of the roller sections. In the second form of the invention, every other belt is trained first about the separating roll and then about the auxiliary roll between the pair of spaced baler rolls, and each belt therebetween is trained first about the auxiliary roll and then about the separating roll between the pair of spaced baler rolls.

The invention also contemplates a method of separating side-by-side belts in a round baler, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION

Figure 1:
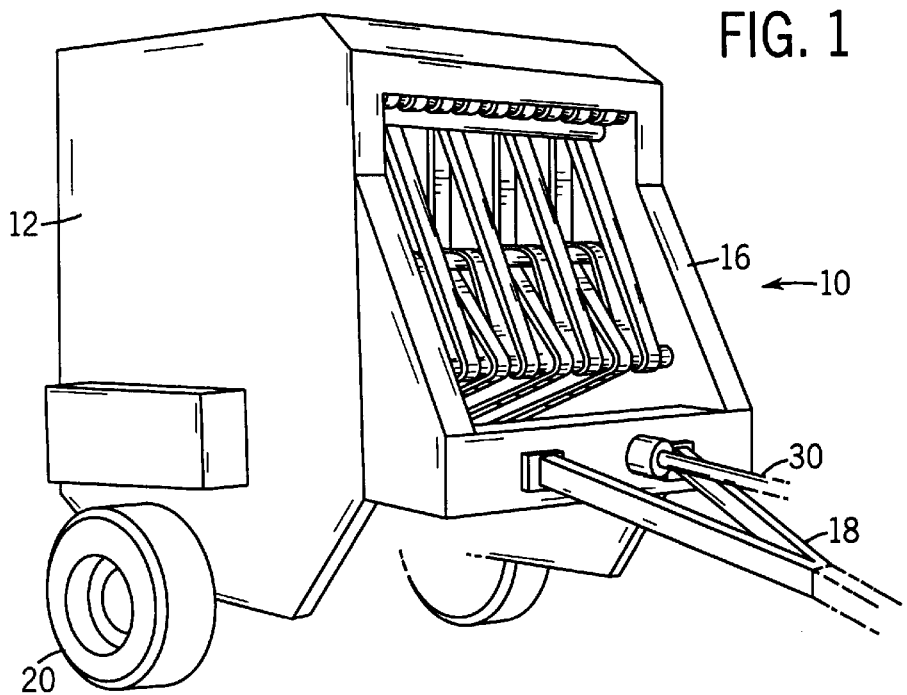
FIG. 1 is an isometric view of a round baler incorporating one embodiment of a belt separating arrangement in accordance with the present invention.
Figure 2:
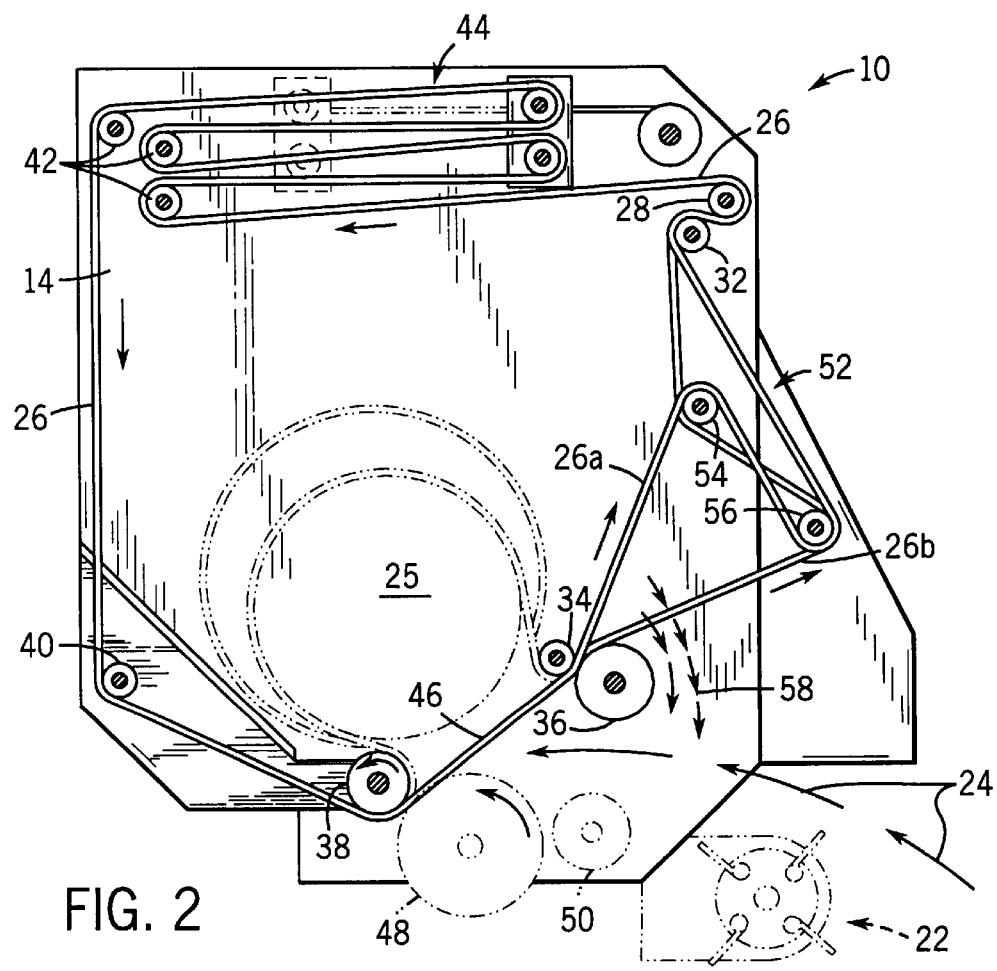
FIG. 2 is a partial sectional view showing the arrangement of the belts and the belt separating arrangement in the round baler of FIG. 1.

Referring to FIGS. 1 and 2, a belt-type, variable chamber baler 10 generally includes a pair of side panels 12, 14, spaced from each other and assembled to a frame assembly. Baler 10 has a forward end 16 to which a tongue 18 is mounted, and is supported by a pair of ground-engaging wheels 20 to enable baler 10 to be pulled by a tractor or other tow vehicle. A crop pick-up mechanism 22 is mounted toward the lower end of baler 10 for picking up windrowed crop material and feeding it rearwardly along a crop inlet stream, shown by arrows 24. These components of baler 10 and their operation are all well known.

A bale-forming chamber 25 is defined between baler side panels 12 and 14, and a series of side-by-side baler belts 26 are trained about a series of baler rolls rotatably supported between baler side panels 12, 14. The baler rolls include a drive roll 28 mounted on the upper, forward portion of baler 10 and driven in response to input power supplied through an input shaft 30 connected to the tractor power take-off mechanism, an upper idler roll 32 located adjacent drive roll 28, and a pivoting roll 34 located toward the lower end of baler 10 adjacent an upper stripping roll 36. Baler 10 further includes a lower stripping roll 38, a lower rear idler roll 40 and a series of upper rear idler rolls 42. A tensioned take-up mechanism 44 accommodates movement of belts 26 as bale-forming chamber 26 increases in size.

Crop material from the crop windrow is fed rearwardly by operation of pick-up mechanism 22 into a crop inlet located between upper inlet roll 34 and lower inlet roll 38, across which a run 46 of belts 26 extends. A floor roller 48 is located adjacent lower stripping roll 38, which cooperates with upper stripping roll 36 and an initial bale-forming roller 50 to define an initial bale-forming chamber which receives crop material from pick-up mechanism 22 upon start-up. In a manner as is known, run 46 expands upwardly into bale-forming chamber 25 as crop material continues to be fed into baler 10.

In accordance with the invention, a belt separating arrangement 52 is located between upper idler roll 32 and upper inlet roll 34. Generally, belt separating arrangement 52 includes a separating roll 54 and an auxiliary roll 56, which are interposed in the path of belts 26 between upper inlet roll 34 and upper idler roll 32. Separating roll 54 is located between upper inlet roll 34 and upper idler roll 32, generally vertically below upper idler roller 32. Auxiliary roll 56 is located below and forwardly of separating roll 54.

Figure 3:
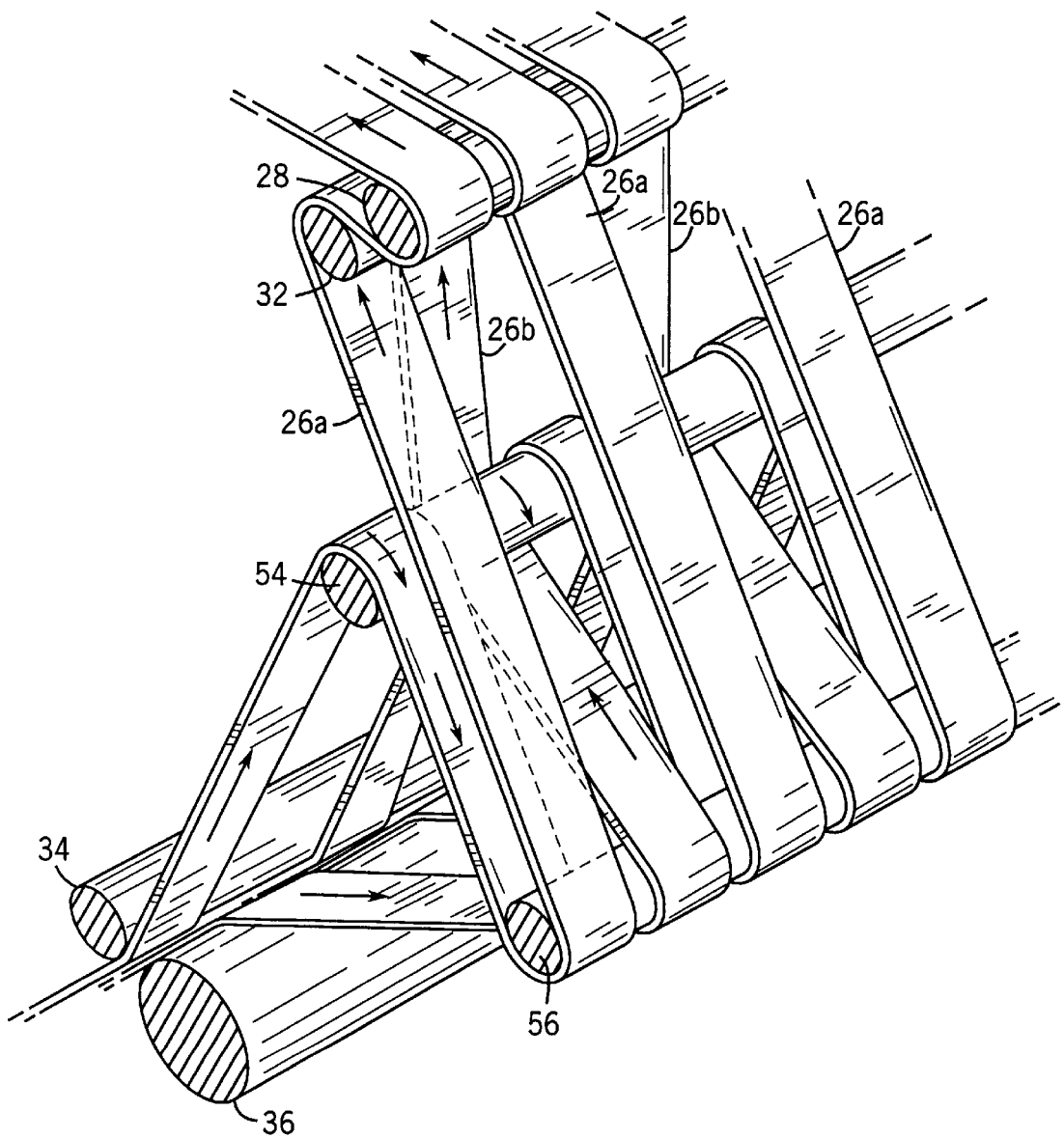
FIG. 3 is a partial isometric view showing a portion of the belt separating arrangement in the baler of FIGS. 1 and 2 in greater detail.

Referring to FIG. 3, each belt 26 in a pair of adjacent belts 26 is trained about separating roll 54 and auxiliary roll 56 differently between upper inlet roll 34 and upper idler roll 32. A first belt in each pair of adjacent belts, shown at 26a, extends from upper inlet roll 34 and is trained about separating roll 54 and then auxiliary roll 56, extending upwardly from auxiliary roll 56 to upper idler roll 32. A second belt in each pair of adjacent belts, shown at 26b, extends from upper inlet roll 34 to auxiliary roll 56, and is trained about auxiliary roll 56. Each belt 26b then extends upwardly from auxiliary roll 56 into engagement with separating roll 54 and to upper idler roll 32. Belts 26a and 26b engage separating roll 54 at different locations on separating roll 54. That is, each belt 26a is engaged with the upper portion of separating roll 54, whereas each belt 26b is engaged with the lower, inner area of separating roll 54.

While the drawings show adjacent belts 26a and 26b arranged in a staggered pattern such that each belt 26b is adjacent one of belts 26a and vice versa, it is understood that belts 26 could be arranged in other configurations. For example, a single belt 26 could be trained as belt 26a while the remainder of belts 26 are trained as belts 26b. Conversely, all but one of belts 26 could be trained as belts 26b with the remainder of belts 26 being trained as belts 26a. In a preferred form, however, every other one of belts 26 is trained as belt 26a and every other one of belts 26 is trained as belt 26b, to maximize the degree of separation of belts 26.

With this arrangement, belts 26a define a downwardly open run bounded by upper inlet roller 34 in combination with separating roll 54 and auxiliary roll 56, which enables crop material adhering to belts 26a to fall downwardly as shown at arrows 58 in the spaces between belts 26b between upper inlet roll 34 and auxiliary roll 56, and into crop inlet stream 24 for incorporation into a bale being formed in bale-forming chamber 25. Likewise, crop material carried by belts 26b between upper inlet roll 34 and auxiliary roll 56 can fall in a similar manner into crop inlet stream 24. In addition, belts 26a and 26b travel in opposite directions and cross each other between separating roll 54 and auxiliary roll 56, which provides a self-cleaning action in that belts 26a will assist in removal of any material extending outwardly from the side edges of belts 26b, and vice versa, to enable such material to fall downwardly through the spaces between belts 26b.

Figure 5:
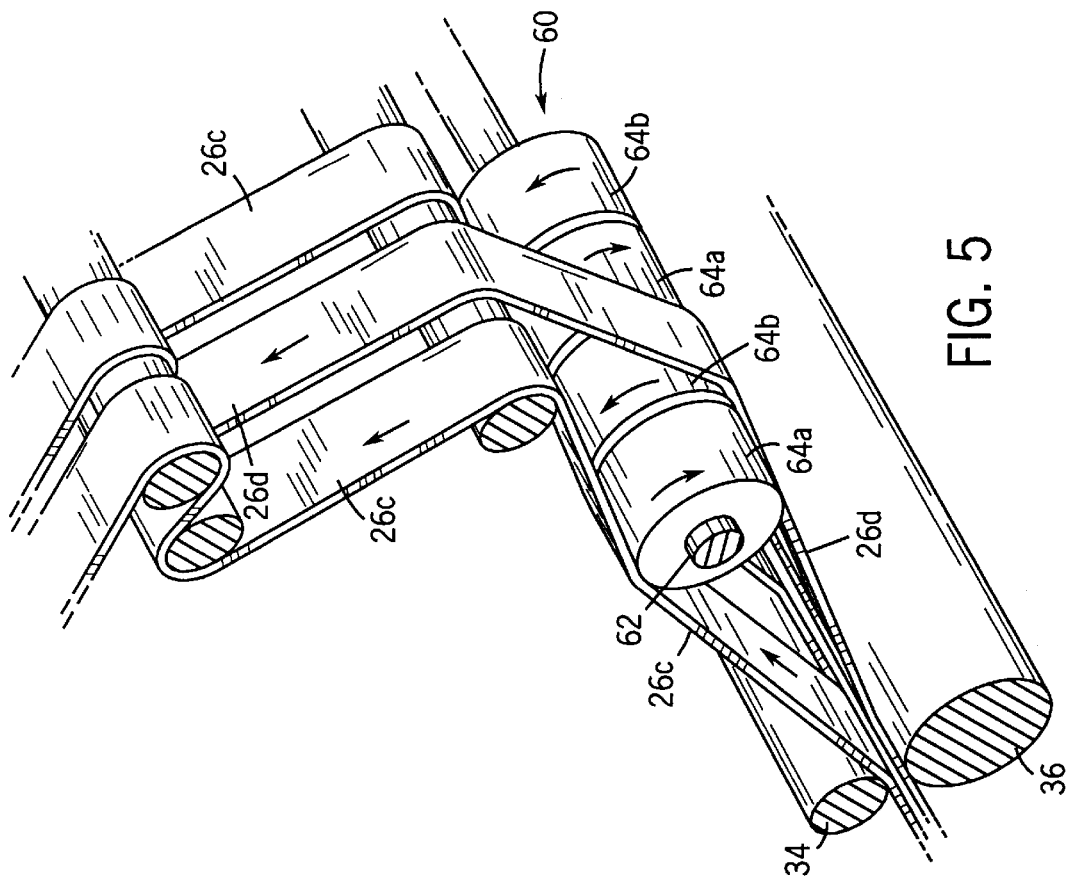
FIG. 5 is a partial isometric view showing a portion of the belt separating arrangement of FIG. 4.
Figure 4:
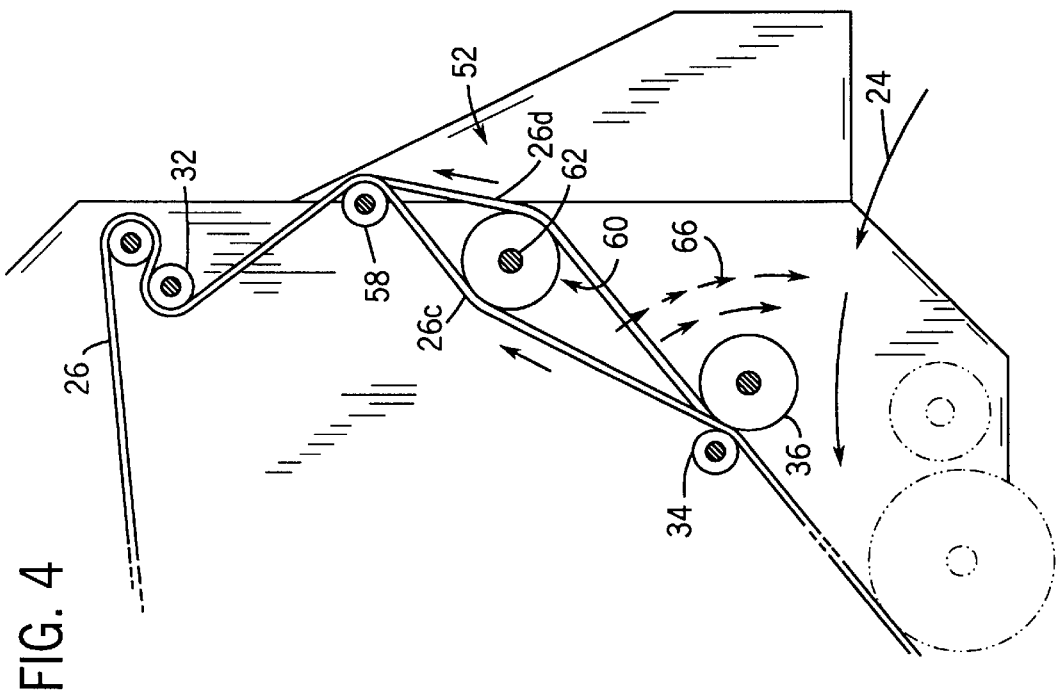
FIG. 4 is a partial sectional view showing an alternative belt separating arrangement in accordance with the invention for incorporation into a round baler.

FIGS. 4 and 5 show an alternative embodiment for belt separating arrangement 52 between upper inlet roll 34 and upper idler roll 32. In this embodiment, an idler roll 58 is positioned below and forwardly of upper idler roll 32, and is also located forwardly of stripping roll 36. Belt separating arrangement 52 is in the form of a sectioned separating roll 60 located between idler roll 58 and upper inlet roll 34 and stripping roll 36.

Sectioned separating roll 60 includes a shaft 62 which extends between side panels 12 and 14 of baler 10. A series of roll sections, adjacent pairs of which are shown at 64a, 64b, are mounted to shaft 62 and are rotatable thereon. In this manner, the longitudinal axis of shaft 62 defines an axis of rotation about which each of roll sections 64a, 64b is rotatable, which is substantially parallel to the axis of rotation of the remaining rolls of baler 10.

Each roll section 64a, 64b engages one of belts 26. The portion of each belt 26 engaged with one of roll sections 64a, shown at 26c, is located on the inner side of the axis of rotation defined by shaft 62, such that each belt 26c is oriented inwardly of separating roll 60. In contrast, each belt 26 engaged with one of roll sections 64b, shown at 26d, is located on the outer side of the axis of rotation defined by shaft 62, such that each belt 26d is oriented outwardly of separating roll 60. In this manner, separating roll 60 functions to separate adjacent belt sections 26c, 26d, such that trash can fall through the spaces between belt sections 26d in the run between stripping roll 36 and idler roll 58, as shown at arrows 66, into crop inlet stream 24. Again, all belts 26 are engaged with the same number of roll in the interior of baler 10, to ensure consistent driving and tracking of belts 26.

Sectioned separating roll 60 thus functions to separate adjacent belts between stripping roll 36 and idler roll 58, and belts 26 then run together to upper idler roll 32 and throughout the remainder of baler 10. Engagement of belt sections 26c and 26d on opposite sides of sectioned separating roll 60 thus functions to create a separation between the belts to enable trash to fall through the spaces therebetween.

With the arrangement of belts 26a and 26b as shown and described, all belts 26 are engaged with all rollers on baler 10 to ensure that all belts 26 are subjected to generally the same driving and tracking forces, while separating adjacent belts 26 to provide spaces through which trash material can fall into the crop inlet stream.

Belt separating arrangement 52 and sectioned separating roll 60 are illustrated as being located toward the front end of baler 10. It should be understood that belt separating arrangement 52 or separating roll 60 may be in any location on baler 10, e.g. adjacent the pivoting tail gate section of baler 10.

Various alternatives and embodiments are contemplated as being within the scope of the following claims particularly pointing out and distinctly claiming the subject matter regarded as the invention.

I claim:

1. A round baler, comprising:
   a series of baler rolls including a pair of spaced rolls defining a crop inlet;
   a series of side-by-side belts trained about the series of baler rolls, wherein the belts define a bale-forming chamber for receiving crop material from the crop inlet; and
   a belt separating arrangement located outside the baleforming chamber for separating adjacent belts, comprising an axially extending belt-separating member located between a spaced pair of the baler rolls, wherein at least a pair of adjacent belts are engaged with the belt-separating member such that a first belt in the pair of adjacent belts engages the belt-separating member at a first location to define a first path of travel for the first belt about the belt-separating member between the pair of spaced baler rolls, and a second belt in the pair of adjacent belts engages the belt-separating member at a second location other than the first location to define a second path of travel for the second belt about the belt-separating member, wherein the second path of travel is different from the first path of travel, and wherein engagement of the first and second belts with the first and second locations, respectively, of the belt-separating member is operable to define an open area between the first and second belts in the vicinity of the belt-separating member, when viewed in a direction along the axis of the belt-separating member.

2. The round baler of claim 1, wherein the belt-separating member comprises a separating roll located between the spaced pair of baler rolls, wherein the first and second belts in the pair of adjacent belts engage the separating roll at first and second locations, respectively, on the separating roll.

3. The round baler of claim 2, wherein the separating roll includes a pair of adjacent rotatable roller sections rotatable about a common axis of rotation parallel to an axis of rotation of each of the spaced pair of baler rolls, wherein the first belt engages a first one of the roller sections on one side of the axis of rotation to rotate the first roller section in a first direction of rotation and the second belt engages a second one of the roller sections on an opposite side of the axis of rotation to rotate the second roller section in a second direction of rotation opposite the first direction of rotation.

4. The round baler of claim 3, wherein the first and second roller sections are rotatably mounted to a shaft which defines the axis of rotation about which the first and second roller sections are rotatable.

5. The round baler of claim 2, further comprising a crop pick-up for feeding crop material into the crop inlet, and wherein the separating roll is arranged such that the first and second belts are separated at a location spaced vertically above the crop pick-up.

6. The round baler of claim 2, further comprising an auxiliary roll offset from the separating roll, wherein the first and second belts are each engaged with the auxiliary roll and with the separating roll at the first and second locations on the separating roll, respectively.

7. The round baler of claim 6, wherein the pair of spaced baler rolls comprises a first baler roll and a second baler roll, wherein the first belt extends from the first baler roll to the second baler roll and is trained first about the separating roll and then about the auxiliary roll in a direction from the first baler roll toward the second baler roll, and wherein the second belt extends from the first baler roll to the second baler roll and is trained first about the auxiliary roll and then about the separating roll in a direction from the first baler roll toward the second baler roll.

8. The round baler of claim 7, wherein the series of side-by-side belts includes a series of pairs of adjacent belts engaged with the separating roll and with the auxiliary roll, wherein the pairs of adjacent belts are arranged such that every other belt is trained first about the separating roll and the auxiliary roll between the first and second baler rolls, and the belts therebetween are trained first about the auxiliary roll and then about the separating roll between the first and second baler rolls.

9. The round baler of claim 7, wherein the first baler roll is located adjacent the crop inlet and wherein the first and second belts extend forwardly therefrom, wherein the auxiliary roll is offset from the separating roll in a forward direction.

10. A method of creating a void between side-by-side belts trained about a series of spaced rolls in a round baler, comprising the steps of:
    positioning a separating arrangement in the path of the belts between a pair of spaced baler rolls;
    engaging a first belt in a pair of adjacent belts with the separating arrangement at a first location on the separating arrangement, wherein the first belt lies in a first plane between the separating arrangement and a first one of the baler rolls; and
    engaging a second belt in the pair of adjacent belts with the separating arrangement at a second location on the separating arrangement other than the first location, wherein the second belt lies in a second plane between the separating arrangement and the first one of the baler rolls;
    wherein engagement of the first and second belts with the first and second locations on the separating arrangement is operable to angularly offset the first plane of the first belt from the second plane of the second belt to create a void between the first and second belts between the pair of spaced baler rolls.

11. The method of claim 10, wherein the step of positioning a separating arrangement in the path of the belts between the pair of spaced baler rolls comprises positioning a sectioned roller member in the path of the belts between the pair of spaced baler rolls, wherein the sectioned roller member includes adjacent independently rotatable sections rotatable about a common axis of rotation, wherein the step of engaging the first belt with the separating arrangement comprises engaging the first belt with a first one of the pair of rotatable sections on one side of the axis of rotation, and wherein the step of engaging the second one of the belts with the separating arrangement comprises engaging the second belt with a second one of the rotatable sections on the opposite side of the axis of rotation, such that the first and second roller sections rotate in opposite directions upon movement of the belts.

12. The method of claim 10, wherein the step of positioning a separating arrangement between the spaced pair of baler rolls comprises positioning a separating roll and an auxiliary roll between the pair of spaced baler rolls, wherein the separating roll and the auxiliary roll are rotatable about substantially parallel axes of rotation which are substantially parallel to the axes of rotation of the pair of spaced baler rolls, and wherein the step of engaging the first and second belts with the separating arrangement is carried out by training the first belt first about the separating roll and then about the auxiliary roll, and training the second belt first about the auxiliary roll and then about the separating roll, wherein the first and second belts engage the separating roll at different locations on the separating roll and wherein the first and second belts cross each other at a location between the separating roll and the auxiliary roll.

13. A round baler, comprising:
   a plurality of parallel, spaced rolls including a group of common rolls and a pair of separating rolls located between a spaced pair of common rolls;
   a plurality of rotatable side-by-side belts supported by the plurality of rolls, wherein the belts define a bale-forming chamber having a crop inlet;
   wherein all of the belts in the plurality of belts engage the common rolls and each roll in the pair of separating rolls, wherein, in the space between the spaced pair of common rolls, at least a first one of the belts is trained first about a first one of the separating rolls and then about a second one of the separating rolls in the direction of rotation of the belts, and at least a second one of the belts is trained first about the second separating roll and then about the first separating roll in the direction of rotation of the belts, wherein the first and second belts define different paths of travel between the pair of spaced common rolls between which the pair of separating rolls are located.

14. In a round baler including a series of side-by-side belts trained about a series of rolls including a pair of spaced-apart baler rolls, the improvement comprising a separating arrangement located between the pair of spaced-apart baler rolls, wherein all of the belts are engaged with the separating arrangement and at least a pair of adjacent belts are engaged in different orientations with the separating arrangement such that each belt in the pair of adjacent belts lies in at least two planes between the pair of spaced-apart baler rolls, wherein the two planes of a first belt in the pair of adjacent belts are angularly offset from the two planes of a second belt in the pair of adjacent belts, wherein the angular offset in the planes of the first and second belts is operable to separate the pair of adjacent belts and form a space adjacent the separating member.

15. The improvement of claim 14, wherein the separating arrangement comprises a separating roll located between the spaced-apart baler rolls, wherein the first and second belts in the pair of adjacent belts engage the separating roll at first and second locations, respectively, on the separating roll.

16. The improvement of claim 15, wherein the separating roll includes a pair of adjacent rotatable roller sections rotatable about a common axis of rotation parallel to an axis of rotation of each of the spaced-apart baler rolls, wherein the first belt engages a first one of the roller sections on one side of the axis of rotation and the second belt engages a second one of the roller sections on an opposite side of the axis of rotation.

17. The improvement of claim 16, further comprising an auxiliary roll offset from the separating roll, wherein the first and second belts are each engaged with the auxiliary roll and with the separating roll at the first and second locations on the separating roll, respectively.

18. The improvement of claim 17, wherein the pair of spaced-apart baler rolls comprises a first baler roll and a second baler roll, wherein the first belt extends from the first baler roll to the second baler roll and is trained first about the separating roll and then about the auxiliary roll in a direction from the first baler roll toward the second baler roll, and wherein the second belt extends from the first baler roll to the second baler roll and is trained first about the auxiliary roll and then about the separating roll in a direction from the first baler roll toward the second baler roll.

19. A round baler, comprising:
   a series of transversely extending baler rolls including a pair of spaced rolls defining a crop inlet;
   a series of side-by-side belts trained about the series of rolls, wherein the belts define a bale-forming chamber for receiving crop material from the crop inlet; and
   a belt separating arrangement located between a pair of spaced baler rolls for separating adjacent belts, comprising a pair of spaced transversely extending separating rolls, wherein each belt in a pair of adjacent belts is engaged with each of the separating rolls in an orientation different than that of the other belt in the pair of adjacent belts, to define a different path of travel for each belt in the pair of adjacent belts between the pair of spaced baler rolls, wherein the different travel paths of the belts between the pair of spaced baler rolls is operable to angularly offset the belts in the pair of adjacent belts from each other to create an area of separation between the belts in the pair of adjacent belts when viewed in a direction along the longitudinal axes of the baler rolls.

20. A round baler, comprising:
   a plurality of parallel, spaced rolls;
   a plurality of side-by-side belts engaged with the plurality of rolls, wherein the belts define a bale-forming chamber having a crop inlet; and
   wherein adjacent first and second belts in the plurality of belts are engaged with the rolls in different orientations wherein the first and second belts cross each other between a pair of the spaced rolls, so that the first belt is angularly offset from the second belt to assist in removing crop material from the first and second belts where the first and second belts cross each other.

21. The round baler of claim 20, wherein the orientations of the first and second belts are such that the first belt and the second belt travel in opposite directions between the pair of spaced rolls.

* * * * *